(12) United States Patent
Sebestyen et al.

(10) Patent No.: US 8,484,949 B2
(45) Date of Patent: Jul. 16, 2013

(54) METHOD AND ARRANGEMENT FOR MONITORING OF AN INJECTOR

(75) Inventors: Richard Sebestyen, Göteborg (SE); Anders Lingenhult, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 223 days.

(21) Appl. No.: 12/596,471

(22) PCT Filed: Sep. 10, 2007

(86) PCT No.: PCT/SE2007/000786
§ 371 (c)(1), (2), (4) Date: Jan. 28, 2010

(87) PCT Pub. No.: WO2008/130294
PCT Pub. Date: Oct. 30, 2008

(65) Prior Publication Data
US 2010/0139254 A1    Jun. 10, 2010

(30) Foreign Application Priority Data
Apr. 19, 2007 (WO) .................. PCT/SE2007/000376

(51) Int. Cl.
*F01N 3/10* (2006.01)
*F01N 9/00* (2006.01)
*G01M 15/10* (2006.01)

(52) U.S. Cl.
USPC .................. 60/286; 60/274; 60/285; 222/52; 222/53; 222/54; 222/55; 222/56; 222/57; 222/58; 222/59; 222/60; 222/61; 222/62; 222/63; 222/64; 222/65; 222/66; 222/67; 222/68; 222/69; 222/450

(58) Field of Classification Search
USPC .................. 60/274, 285, 286; 222/52–69, 450
See application file for complete search history.

(56) References Cited

U.S. PATENT DOCUMENTS

| 5,852,929 A | * | 12/1998 | Kato et al. | .................. 60/274 |
| 6,082,337 A | * | 7/2000 | Fujimoto et al. | .............. 123/520 |
| 6,289,723 B1 | * | 9/2001 | Leon | ............................. 73/49.8 |

(Continued)

FOREIGN PATENT DOCUMENTS

| DE | 102005001119 A1 | 7/2006 |
| DE | 102006005863 A1 | 8/2007 |

(Continued)

OTHER PUBLICATIONS

International Search Report for corresponding International Application PCT/SE2007/000386.

(Continued)

*Primary Examiner* — Kenneth Bomberg
*Assistant Examiner* — Brandon Lee
(74) *Attorney, Agent, or Firm* — WRB-IP LLP

(57) ABSTRACT

A method is provided for monitoring of the functionality of an After Treatment Injector (ATI) for injection of a fluid in an engine exhaust gas system upstream of an exhaust gas treatment unit. The monitoring is performed by using a pressure sensor which detects the pressure of the fluid delivered to the ATI for a specific condition or injection cycle. The pressure sensor is located downstream of a flow regulator and upstream of the ATI in a conduit for supplying of a substance from a container to the ATI. An ECU is programmed to perform a predetermined sequence of opening and closing commands for the flow regulator and the ATI, furthermore perform a frequency analysis of the measured pressure value in order to monitor the functionality of the flow regulator, the ATI and the pressure sensor. The method is adapted to be used in connection with an On Board Diagnosis (OBD) system.

10 Claims, 5 Drawing Sheets

U.S. PATENT DOCUMENTS

| | | | |
|---|---|---|---|
| 7,451,601 B2 * | 11/2008 | Taware et al. .................... | 60/773 |
| 2002/0088220 A1 | 7/2002 | Weigl | |
| 2003/0061805 A1 | 4/2003 | Hirooka et al. | |
| 2004/0074453 A1 | 4/2004 | Roelle et al. | |
| 2004/0094133 A1 * | 5/2004 | Lingenhult et al. ........... | 123/519 |
| 2004/0194446 A1 | 10/2004 | Hirroka et al. | |
| 2006/0168941 A1 * | 8/2006 | Pfaeffle et al. ................... | 60/274 |

FOREIGN PATENT DOCUMENTS

| | | |
|---|---|---|
| EP | 1176292 A1 | 1/2002 |
| JP | 2002038940 A | 2/2002 |
| JP | 2002129945 A | 5/2002 |
| WO | 2005061866 A1 | 7/2005 |

OTHER PUBLICATIONS

International Preliminary Report on Patentability for corresponding International Application PCT/SE2007/000386.

International Search Report for corresponding International Application PCT/SE2007/000786.

* cited by examiner

METHOD AND ARRANGEMENT FOR MONITORING OF AN INJECTOR

The present application is a U.S. national stage application of PCT/SE2007/000786, filed Sep. 10, 2007, which is a continuation of PCT/SE2007/000376, filed Apr. 19, 2007, both of which are incorporated by reference.

BACKGROUND AND SUMMARY

The invention relates to a method and a system for monitoring of the functionality of an injector for injection of a fluid in an engine exhaust gas system, a so called After Treatment Injector (ATI). The monitoring is performed by using a pressure sensor which detects the pressure of the fluid delivered from the injector for a specific injection cycle whereby the pressure and pressure fluctuations are registered and compared with reference values in order to indicate the state of the injector. The invention is suitable to be used as a part of the On Board Diagnosis (OBD) system.

In vehicles today, the feature of being able to monitor, regulate and control an exhaust gas purification system comprising a filter and/or catalyst is of major interest in order to provide a well functioning exhaust gas treatment system. One suggestion to improve the functioning and control of such a treatment system, in particular those systems used for heavy duty vehicles operated by a diesel internal engine, is to include a separate injector in the exhaust gas system downstream of the engine exhaust gas outlet and upstream of at least one of the purifying devices, e.g. a filter, NOx trap or catalyst, in order to inject a liquid for enhancing the performance of the system. The injected liquid may for example be urea, which is used to improve the efficiency concerning NOx reduction, or hydrocarbons, which may be added to be combusted and thus increase the temperature of the gases in order to regenerate the filter.

In the case an exhaust gas purification system comprises such an injector as described above, commonly named After Treatment Injector (ATI), the performance of the system is highly dependent on the functioning of the injector device. If the liquid not is injected properly in the exhaust gas stream there will be negative environmental consequences due to malfunctioning of the purification system.

One known way of indicating the functioning of the system may be to measure the exhaust gases which pass the purification device. In case of NOx reduction, the NOx content after the treating unit may be calculated or measured by a lambda sensor which indicates the level of NOx coming out of the system. From the measured or calculated levels of NOx it is possible to conclude the functionality of the exhaust gas purification system. In the case of addition of hydrocarbons or some kind of fuel in order to elevate the temperature, either the temperature or the content of fuel in the exhaust gases passing the purification system may be measured or calculated in order to determine whether the system is working satisfactorily or not. However, these systems have the drawback of not unambiguously pointing out what part of the purification system that is not working in a sufficient way, e.g. it may be that the NOx trap, the filter and/or the catalyst is deteriorated and not working efficiently enough or it may be the ATI which is malfunctioning. Hence, it is not possible to indicate which part that should be investigated or changed in order to make the system work satisfactorily again.

In EP 1 176 292, a system is disclosed for monitoring of the functionality of an ATI (After Treatment Injector). This system includes an exhaust gas purifying catalyst provided in an exhaust passage of an internal combustion engine, a reducing-agent supplying mechanism for supplying a reducing-agent to the exhaust gas passage upstream of the catalyst and pressure detecting means for detecting a pressure in the reducing-agent supplying mechanism. The reducing-agent supplying mechanism comprises an injection nozzle arranged in an exhaust passage, a reducing-agent supplying passage for conducting reducing-agent to the injection nozzle, an amount controlling valve for controlling an amount of reducing-agent injected by the injection nozzle and a shut-off valve for shutting off the reducing-agent supplying passage.

On the basis of the pressure detected by the pressure detecting means, abnormality of the reducing-agent supplying mechanism is detected by an abnormality determining means. By this system it may for example be possible to detect when reducing-agent is leaked from the reducing-agent supplying mechanism or to detect if reducing agent is leaked out of or into a closed space defined in the reducing-agent supplying mechanism, e.g. when a passage from the shut-off unit to the reducing-agent adding unit is closed. Furthermore, if the reducing-agent adding unit is clogged, it may be detected by the pressure sensing unit that the pressure downstream from the passage opening/closing valve becomes difficult to be lowered after the valve opening period. If the reducing-agent adding unit is brought into a failure in closing, the pressure downstream from the passage opening/closing valve becomes lower. Further, when the passage opening/closing valve is brought into a failure in opening or closing the valve, the passage opening/closing valve is always closed/opened and therefore, the pressure downstream from the passage opening/closing valve becomes constant during the valve opening period and before and after the valve opening period.

Hence, when an abnormality is caused in the reducing-agent adding unit and/or the passage opening/closing valve, the pressure downstream from the passage opening/closing valve during, before or after the valve opening period of the passage opening/closing valve, indicates a value in accordance with the characteristic of the abnormality. Therefore, the abnormality determining means can determine abnormality of the reducing-agent adding unit and/or the passage opening/closing valve on the basis of pressure detected by the pressure detecting means during, before or after the valve opening period of the passage opening/closing valve.

However, even though the system described in EP 1 176 292 describes a system for monitoring an After Treatment Injector, the above described system of monitoring the pressure in the injector may not be accurate and efficient enough for detection of malfunctioning of an injector at certain circumstances and there may be a need to be able to detect small differences in the injection system, e.g. when only a small part of the injector is clogged.

Hence, there is still a need to provide an improved method which provides robustness in checking the functionality of an After Treatment Injector (ATI).

According to an aspect of the present invention, an After Treatment Injector is controlled to vary between an open and closed state with a specific frequency. The specific frequency, or, if desired, a number of specific or predefined frequencies of opening and closing the injector, have a specific corresponding pressure frequency signal which is indicating normal injector function. Hence, by commanding the injector to open and close with a specific frequency, a corresponding signal variation is expected from a pressure sensor located in the injector or in a pressure reservoir in communication with the injector and being influenced by the opening and closing of the injector.

In order to provide a strong signal of the pressure variations, the chamber wherein in the pressure sensor shall be located is preferably rather small. The idea of using frequency analysis of a fuel injector is for example described in EP 244258, U.S. Pat. No. 5,445,019, U.S. Pat. Nos. 5,058,019 and 6,901,791. However, all these documents disclose the use of this kind of analysis for a fuel injector for injecting fuel to a combustion chamber of a cylinder. The pressure indicating the functioning of the fuel injector in this case will predominantly, if not completely, arise from the pressure fluctuations caused by the ignition and burning of the injected substance, i.e. fuel, in the cylinder and the different compression stages which will be therein.

In the case of an After Treatment Injector, there are no, or very small fluctuations, arising from an oscillating backpressure in the exhaust gas system due to a reaction of the injected substance. However, there are small pressure fluctuations in the exhaust gas conduit which will affect the pressure sensed by the pressure sensor. In order to measure the desired pressure fluctuations, i.e. the fluctuations caused by the opening and closing of the injector which induces pressure waves in the ATI or in a pressurized reservoir located in connection with the ATI, corrections may be made for these undesired pressure fluctuations originating from the exhaust gases. This may for example be made by mapping the background fluctuations (noise) and subtract it from the measured values from the sensor. The mapping are preferably made for the desired operating points of engine wherein a test cycle, or a combined test cycle and regeneration cycle, are intended to be performed. The mapping may of course be made for any number of engine operation points so as to be able to perform a test of the injector at a great number of engine operation points. There may of course also be other conditions or variables which could be considered when making these maps. Alternatively, a second pressure sensor may be located in the exhaust gas conduit and the pressure sensed in the conduit may be subtracted from the pressure sensed in the ATI so as to achieve a value of the pressure fluctuations originating from the opening and closing of the ATI. However, a mapping of the pressure fluctuations, at a specific operating point with the injector closed, using the same pressure sensor (or a second sensor located close the first one in the same pressure environment) is preferred since it will provide a pressure fluctuation map for the specific location where the pressure for monitoring of the injector will be measured and thus provide a better match of actual pressure fluctuations at the measure point.

The system may however also work without these correlations by suggesting that the fluctuations from the exhaust gases represents white noise and thus can be ignored and filtered by mathematical methods. According to one embodiment, the pressure fluctuations signals from the opening and closing of the injector or a control valve connected to the injector are separated from the other pressure signals (noise) by filtering off the noise by the use of Fourier analysis. If for example a Phase Width Modulator (PWM) signal is used having a frequency of 10 Hz an operating in a 50% PWM cycle (i.e. the cycle is to open the valve for 50 ms and close the valve for 50 ms and so on) the frequency of 10 Hz is the frequency to be extracted. This filtering, using mathematical methods, may of course also be performed together with the filtering using a reference curve from raw data or a pressure sensor in the exhaust conduit. The extraction of the desired frequency may for example be made by using Fourier Analysis (FA) or fast Fast Fourier Transform Analysis (FFTA). Hence, these and other mathematical methods may be used to filter off signal characteristics and disturbing amplitude variations at other frequencies than the desired such that the remaining amplitude variations essentially only originates from pressure fluctuations due to the control of the opening and closing of the injector or a valve controlling the flow to the injector. The refining of the pressure signals may of course include both mathematical methods and comparing and subtracting noise signals by the use of measured reference maps.

It is evident that that the pressure fluctuations sensed by the pressure sensor in or near the ATI in addition to sense pressure differences in the pressure chamber of the injector due to the actual opening and closing of the injector also will, in case the pressure not is built up in the injector itself but delivered from a pressurized source, detect the functioning of the corresponding opening and closing of a shut off valve for filling up the pressure chamber for the injector. It has not hitherto been suggested to use a frequency analysis for this purpose, i.e. for ATIs, since it has been considered that it is essential to use the pressure variations caused by the pressure differences from the compression and burning of fuel in the combustion chamber to use this kind of analysis. However, in spite of such prejudices, research and inventive work has shown that the method of frequency analysis also is applicable for an After Treatment Injector.

According to the invention, the pressure sensor will be affected by the fuel delivery and the termination of fuel delivery at the injector orifice. This fluid pressure effect could be differentiated by spectral analysis, i.e. to evaluate the amplitude of the pressure sensor signal, simultaneously as the injector opens respectively closes with a specified frequency. If the injector is clogged, than there is no pressure oscillation and the injector can be judged as faulty. In order to verify different kind of faults or different stages of clogging, it is possible to provide maps of data for example representing a certain area of the injector which is restricted and thus representing a certain amount of clogging so as to define different status of clogging.

The injector status (e.g. clogged, mechanically stuck or slow) can be evaluated as the pressure sensor will indicate both the amplitude and timing of the oscillation which can be compared with the expected shape of the pressure characteristics corresponding to the expected fuel delivery from the injector according to a defined duty or test cycle.

The information achieved from the analysis may be used to compensate the system for the deficiencies. If for example the injector is clogged, the system may compensate for the smaller volume of treatment agent which will be injected in each cycle by prolonging the cycle with a certain time period or change the duty cycle to keep the injector open for a longer time in each cycle, e.g. keeping the injector open 75% of the time and closed only 25% of the time in each cycle instead of keeping the injector closed respectively open the same time period. The mapping may for example contain reference maps which simulates different stages of clogging corresponding to different duty cycles which aims to deliver the same amount of fuel as should have been delivered by a perfectly clean injector during a normal duty cycle.

The described method and system may either be used when injecting an after treatment substance according to an ordinary duty cycle for injecting exhaust treatment substance for treatment of the exhaust gases or for performing a self-testing cycle specifically designed to monitor the condition of a reducing-agent or other treatment substance supplying mechanism.

In one embodiment of the invention, when the injected after treatment substance is for example a fuel, a cycle for injecting substance for testing the ATI may be combined with an injection cycle for the purpose of elevating the exhaust gas temperature. For example, for heavy duty engine with Diesel Particle Filter (DPF) regeneration strategies, such an active diagnostic function as described above can be integrated in a regeneration control strategy. Any emission effect due to excessive fuel delivery is integrated as an initial phase in a regeneration control mode. In this way, no negative environmental impact from using a specific test cycle is made as the extra heat is used for a regeneration purpose.

In one embodiment of the invention, the above described method and system may be used for checking the pressure sensor itself. This may be achieved by using additional features on an On Board Diagnostic system such as temperature or NOx-sensors which will indicate if break through of NOx occurs or not or if the temperature is elevated or stable when a regeneration shall be performed. In case the data from the pressure sensor indicates a malfunctioning of the injector but the overall performance of the system is working satisfactorily, e.g. no NOx break through or a desired temperature rise occurs when regeneration shall be performed, it may be deduced that the pressure sensor is not working as it should.

A system for performing the method according to the present invention comprises an After Treatment Substance Injection System (ATSIS) including an After Treatment Injector (ATI). The ATI is located in an engine exhaust system downstream an outlet for exhaust gases from combustion chambers of an engine, e.g. a diesel IC-engine. The ATI is further located upstream of a purification unit in the exhaust gas system, e.g. a filter, catalyst or trap, so as to inject a substance in the exhaust gases in order to enhance a functionality of the system, e.g. the adding of urea to improve the NOx-purification of the exhaust gases or to add HC-containing substance (fuel) for the purpose of regeneration of a filter unit.

As will be evident from the following, it is not necessary to specify the substance to be injected into the exhaust gas stream but the inventive system will work for adding of a desired substance. In some aspects, it will improve the monitoring efficiency if the system cooperates with another On Board Diagnosing (OBD) system which is able to detect the overall functionality of after treatment exhaust gas system.

The ATI is connected to a supply tank of the desired substance to be injected to exhaust gas treatment system, e.g. to the fuel tank of the vehicle, a separate fuel tank or to a urea or ammonia tank, by a conduit.

The After Treatment Substance Injection System (ATSIS) may further comprise a flow control unit for controlling the pressure in the conduit for supplying of the substance from the container to the After Treatment Injector (ATI). The flow control unit may for example be a valve arrangement which may be closed, to cut off the connection to a pressurized system upstream the valve, or open, to set the pressure downstream the valve to the same as upstream, e.g. to the same value as a pressurized tank. As another alternative the flow control unit may be a pump or compressor which may pressurize the system downstream of said pump or compressor. In still one version it may be possible to use an injector which will build up its pressure within itself. However, even though such an arrangement is possible, the use of a pressurized source of treatment agent is the most commonly used arrangement for an ATI since it is in general easier to provide such an arrangement.

A pressure sensor is located downstream of said flow control unit in the ATSIS so as to be able to measure the pressure of the substance which is to be injected from the ATI into the exhaust gas stream. The pressure sensor may be positioned either in the injector or in a reservoir close to the injector containing the substance to be injected and being influenced by the pressure changes which will result from the opening and closing of the injector.

The ATSIS also comprises an Electronic Control Unit (ECU) which is controlling the opening and closing the After Treatment Injector (ATI). The ECU may also control a flow control unit for control of the flow of substance from a tank to the injector in case the system is provided with such a flow control unit.

In order to monitoring the system performance of the ATSIS, an On Board Diagnosing (OBD) system is connected to the ECU and the pressure sensor. The OBD is provided with comparative data for the functionality of the After Treatment Substance Injection System (ATSIS) in order to detect abnormal functionality of the ATI. The OBD is preferably provided with data, or maps, representing different faults or different stages of clogging, so as to provide information when compared with the actual measured values in order to indicate different possible faults of the injector.

This method of monitoring the ATI may of course also be used for monitoring other components of the ATSIS, e.g. a flow control unit for control of the flow from a tank to the injector in case the system is provided with such a unit. By the use of a specific, predefined sequence of opening and closing commands for the flow control unit and the After Treatment Injector (ATI) for the sole purpose of monitoring the functionality of the system, a more accurate and reliable measurement of the system will be achieved. It will thus be easier to detect malfunctioning of the ATSIS at an earlier stage and also to better locate the cause of the malfunctioning of the ATSIS. Hence, the ECU may be programmed to send out control signals to the flow control unit and the ATI to close and open following a specific sequence and timing for changing their positions. During such a monitoring cycle, the output values from the pressure sensor are logged such that the actual pressure data may be compared with the comparative data in the OBD system. According to specific criteria for indicating a malfunction of the ATSIS (e.g. a certain pressure value outside the allowed range or a change of a pressure value being outside the allowed limit), it may be possible to deduce which part, e.g. the flow control unit, the After Treatment Injector (ATI) and the pressure sensor, which is malfunctioning and in which way it is deficient.

The control sequence may for example be performed at certain time intervals, on demand of a driver or as a consequence of a fault detected in the exhaust gas treatment system by an On Board Diagnosing (OBD) system. There may also be several different control sequences programmed in the ECU which differs in the consecutive order of performing the opening and closing commands and in the time intervals for the changes of the status of the controlled devices (the ATI and the flow control unit) from open to closed. For example, when it is desired to monitor if there is a small leak in the system, it might be desired to keep the controlled devices in a fixed state so as to be able to detect a slow change in the pressure.

According to an embodiment of the invention, the control sequence to be performed is as follows:
1. Set the flow control unit to open and set the ATI to closed.
2. Close the flow control unit and keep the ATI closed.
3. Keep the flow control unit closed and open the ATI
4. Keep the flow control unit closed and close the ATI.
5. Open the flow control unit to open and keep the ATI closed.

The time duration that each sequential step keep the ATI may be adjusted to best fit the purpose of what feature that is to be detected. However, in order to perform data which is comparable with the reference data in the OBD system the sequential monitoring should be performed according to any of these reference sequential timings.

In table 1 below it is described the output from the pressure sensor depending on different possible faults of a number of relatively frequently occurring faults when using the above described control sequence. In this system it is suggested that the flow control unit comprises a regulating valve which may be closed or opened in order to allow flow of the desired substance from a pressurized supply through a conduit to the ATI. The pressurized supply and the valve may of course be substituted for a pump or the like which also may be detected according to the table below. In that case "Valve closed" corresponds to non-functioning of the pump, "Valve clogged" to reduced pumping effect of the pump, "valve leakage" to a continuous, low pumping action of the pump and "Valve open" to a continuous high pumping effect of the pump.

is detected if the valve is leaking while the pressure is kept at a constant, low pressure if the fault indicated is caused by a clogged ATI.

Even though there are certain features in the schematic table of fault indications in table 1 which seems to be not distinguishable from each other, the fault may be localized by the use of an OBD which is monitoring the overall exhaust gas purification system. For example, the symptoms that a sensor is stuck in a position indicating low pressure and the symptom that the valve is stuck in closed position (and the conduit is empty) have the same indication in table 1. Likewise, when the sensor is stuck in a position indicating high pressure and the ATI is stuck in closed position, the same pressure indications are present according to table 1. However, it will still be easy to monitor if it is the sensor or the valve/ATI which is failing by using the OBD system checking the functionality of

TABLE 1

| Functionality | 1 | 2 | 3 | 4 | 5 |
|---|---|---|---|---|---|
| All functions OK | System pressure | System pressure | Normal pressure drop curve | Low pressure | Normal pressure rise curve |
| ATI closed | System pressure | System pressure | System pressure | System pressure | System pressure |
| ATI clogged | System pressure | System pressure | Slow pressure drop curve | Low pressure | Normal pressure rise curve |
| ATI leakage | System pressure | Pressure drop | Reaches fast low pressure | Low pressure | Slow pressure rise curve |
| ATI open | System pressure or lower pressure* | Fast pressure drop to low pressure | Low pressure | Low pressure | Low pressure, (maybe a little rise |
| Valve closed | Low pressure (could be system pressure if the conduit is full) | Low pressure (could be system pressure if the conduit is full) | Low pressure (could be normal pressure drop curve) | Low pressure | Low pressure |
| Valve clogged | System pressure | System pressure | Normal pressure drop curve | Low pressure | Slow pressure rise curve |
| Valve leakage | System pressure | System pressure | Slow pressure drop curve | Increased pressure | Reaches fast system pressure |
| Valve open | System pressure | System pressure | System pressure or extra slow pressure drop curve* | System pressure or fast increased pressure to system pressure | System pressure |
| Sensor High | System pressure | System pressure | System pressure | System pressure | System pressure |
| Sensor middle | Middle pressure | Middle pressure | Middle pressure | Middle pressure | Middle pressure |
| Sensor low | Middle pressure | Middle pressure | Middle pressure | Middle pressure | Middle pressure |

*= The different responses are dependant on flow ratio between valve and ATI (e.g. if the valve is open and allowing a larger flow than the ATI, the valve will fill up the system fast and keep the pressure constant also when the ATI is open).

By following a programmed sequence of opening and closing commands for the flow control unit and the (ATI) it will be possible to distinguish faults of different components which not may be distinguished by one single measurement or by only measuring the absolute values of the pressure in different conditions. For example, the occurrence of a slow pressure drop curve in step 3 (The valve is kept closed and the ATI is opened) indicates either valve leakage or ATI clogged. However, these faults may be distinguished in step 4 (The valve is kept closed and the ATI is closed) where an increased pressure the overall performance of the exhaust gas treatment system. If the functionality of the purification of gases still is working satisfactorily, it can unambiguously be deduced that it is the pressure sensor which is failing while if the purification of gases not is working satisfactorily, it is most probably the valve or ATI which is failing. If for example, an elevated amount of NOx is detected, it may be an indication of malfunctioning of an ATSIS for urea. If it is indicated constant high or low pressure from the pressure sensor during the test cycle, it may be deduced that the flow control (low pressure indicated) or the ATI (high pressure indicated) are stuck in closed positions. Likewise, the same distinguishing of a faulty component may be done if it is detected a relatively constant temperature of the exhaust gases downstream a filter during a regeneration cycle. Such monitoring systems, using temperature sensors, lambda sensors or the like indicating devices for monitoring the state of a system, are well known in the art and are commonly used in vehicles OBD systems. Hence, it would thus be possible to add this information together with the information from the ATSIS to be able to distinguish an error indication of the sensor from an error of the valve or ATI function.

The ATSIS monitoring system may for example only be used when there is a malfunctioning in the exhaust gas treatment system so as to deduce whether it is the ATSIS or some of the exhaust gas purification units, e.g. a filter, catalyst or trap, which is malfunctioning. A positive result from the test cycle described above would clearly indicate that the ATSIS is working as it should and it can be deduced that it is some of the other components of the system which not is working satisfactorily.

In table 1, a very simplified model for a certain test cycle is described describing very briefly the principles of how the inventive idea may be used. Preferably there is a curve made for each desired test cycle comprising the standard values for a working ATSIS. This curve may be made as a general curve according to a standard value for the system and a specific cycle. It would also be possible to log a cycle for a specific system of a specific vehicle. In this case it would be possible to adjust the curve for the natural deterioration of a system which still works well enough even though its efficiency is not as good as for a brand new system. For example, there has been an inspection including renovation and/or replacement of one or several parts of the exhaust gas treatment system including an ATSIS. When the replacement/renovation is considered done, and the system should be ready to work, a new reference curve may be logged and used as the comparative curve for this specific system. Some times this adaptation may be necessary if the system is upgraded and some essential parameters are adjusted or replacement of components demanding different operating parameters, e.g. a new ATI is mounted to the system which requires a higher delivery pressure. The above monitoring system may thus easily be modified in order to compensate for the changes introduced in the system and still work in a satisfactorily way for controlling the performance of the system.

Below follows a detailed description of a system which is adapted to involve the features of the above described method. It shall be noted that the system described herein may either be constructed as described below or used to modify an existing system, e.g. the system described in EP 1 176 292, so as to provide an improved monitoring of an after treatment substance injection system.

DETAILED DESCRIPTION

Figure 1:
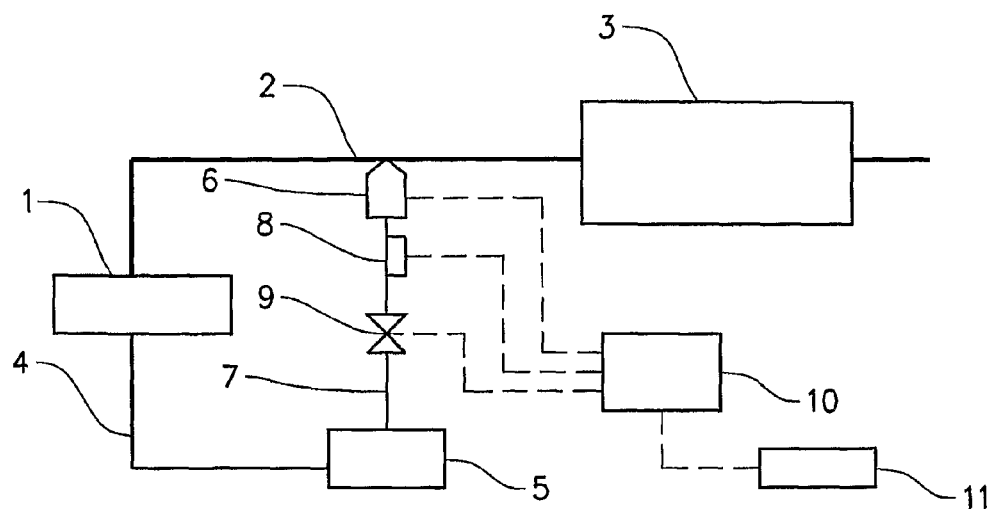
FIG. 1 shows a schematic figure of an engine exhaust gas treatment system comprising an After Treatment Substance Injection System (ATSIS)

In FIG. 1 is very briefly described the different parts of an engine exhaust gas system comprising an After Treatment Substance Injection System (ATSIS) according to the invention. An internal combustion engine 1 is connected to an exhaust gas pipe 2 for collecting and guiding of exhaust gases from the engine to an exhaust gas treatment unit 3. The exhaust gas treatment unit 3 may for example be a filter, reduction or oxidation catalyst, NOx-trap or a combination of such treatment devices. Fuel for the engine 3 is supplied by a fuel conduit 4 from a fuel tank 5. An After Treatment Injector (ATI) 6 is located in the exhaust gas pipe 2 downstream of the engine 1 and upstream of the purification unit 3. The ATI 6 is connected to the tank 5 by means of an after treatment substance conduit 7 so as to allow a flow of substance from the tank 5 to the ATI 6. The flow of substance may be caused either due to a pressurized tank or a pumping arrangement. A pressure sensor 8 is located in the substance conduit 7 upstream of an outlet nozzle (not shown) of the ATI and downstream of a flow regulator 9, e.g. a valve. The ATI 6, the pressure sensor 8 and the flow regulator 9 are connected to an Electronic Control Unit (ECU) 10. The ECU 10 controls the flow regulator 9 and the ATI 6 so as to perform the desired actions (opening/closing commands) in order to inject the substance from the tank 5 into the exhaust gas pipe 2. The ECU 10 further receives signals from the pressure sensor 8 so as to be able to monitor the pressure in the conduit at any time and a pressure curve may be made from continuously measured values or from discrete pressure values sampled at desired time intervals. In order to be able to monitor the system as described herein, the pressure sensor 8 shall be located in between two devices which control the flow, e.g. the ATI 6 and the flow regulator 9. In the present case, since the substance conduit 7 is connected to a common fuel tank 5 which normally not is pressurized, the flow regulator preferably comprises a pump (not shown), for supplying a substance from the tank 5 to the ATI 6, and a valve arrangement which may be separate parts or an integrated unit. The pump may either be designed to deliver a certain pressure or be able to produce a variable pressure to the substance conduit 7 downstream the pump. The ATI 6 may include a nozzle which is adapted to allow a flow of substance when the pressure is above a certain limit and also provided with shut off valve which makes it possible to completely shut off the flow. It is also possible to have a nozzle which may change its threshold value for delivering of fluid. The nozzle and valve may be separated parts or one integrated functional part in the ATI 6. The ECU may further be connected to an On Board Diagnosis (OBD) system 11 such that it is possible to use the information from the ECU 10 and the monitoring sequence in order to be able to check the indications from the test cycle with other data concerning the overall system in order to improve the performance of the diagnosing system. The OBD system 11 may for example have information concerning the overall performance of the exhaust gas treatment system which in addition to the information from the ECU 10 facilitates the diagnosing and recognizing of a malfunctioning unit.

As described herein, the OBD 11 and ECU 10 are different physical entities. It is obvious to the skilled person in the art that these functions may be one single unit or that these units may be divided into further subunits. Also to be note, the pressure sensor 8 is connected to the ECU 10 in this figure but may also as well be connected to the OBD 11.

As described above, the ATI 6, the pressure sensor 8 and the flow regulator 9 are separate units. These elements may also be integrated parts, e.g. a pressure sensor 8 integrated in the ATI 6 or flow regulator 9, as long as the pressure sensor 8 is sensing the pressure in the part of the conduit located between the ATI 6 and the flow regulator 9.

Figure 2:
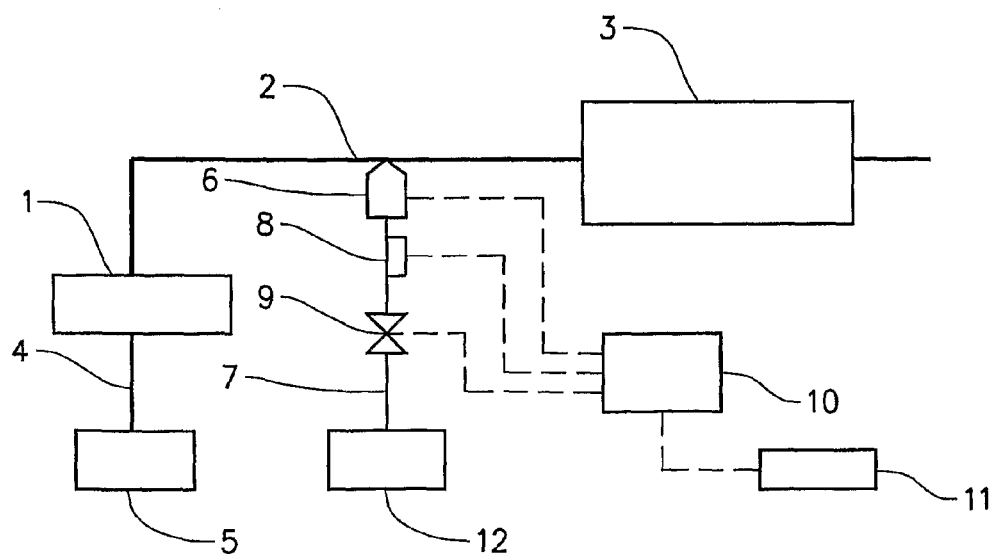
FIG. 2 shows an engine exhaust pressure regulating system according to the present invention

In FIG. 2, the only difference compared to FIG. 1 is that the substance conduit 7 is connected to a separate tank 12. In this case, the tank 12 is preferably pressurized and the flow regulator 9 is a valve which may be a rather simple valve only having the position of open and closed or having the ability to set a desired pressure in the substance conduit 7 downstream the conduit, e.g. to allow the flow of substance into the downstream conduit to build up a desired pressure and then close the valve or set the valve to keep a constant value of the pressure.

Hence, in this case, it shall be noted that the separate tank may contain either the same substance, i.e. fuel, or another substance, e.g. urea, ammonia or water. In addition, it will be possible to have another substance than a liquid, e.g. a gas, to be introduced into the system, in a particular embodiment it may be used hydrogen as fuel for the regeneration of a filter since hydrogen does not provide any additional particles which may be clogged to the filter and therefore provide a pure combustion product of water and no residual, not burnt fuel.

Figure 3A:
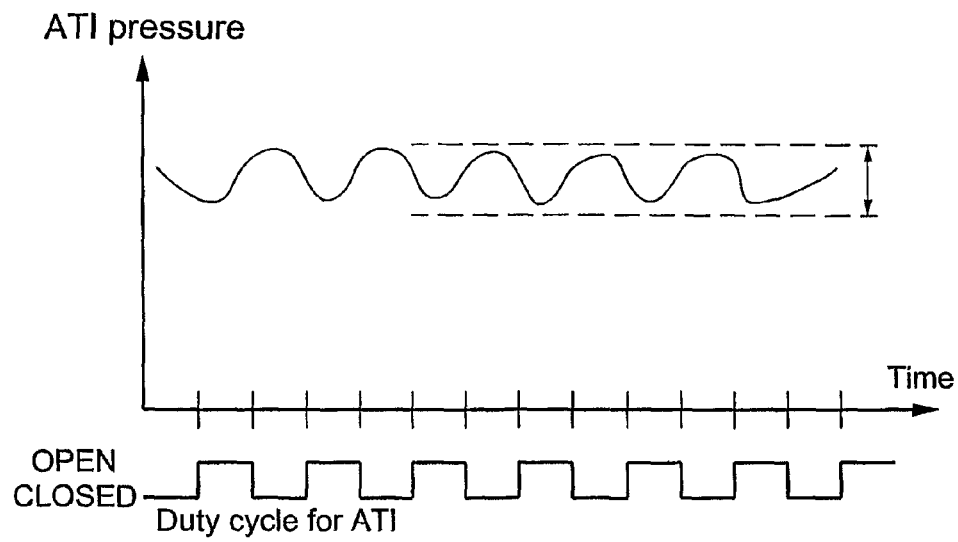
FIG. 3 shows a curve made from spectral analysis of the detected pressure values for a working injector (FIG. 3 a) and for a defect injector (FIG. 3 b)
Figure 3B:
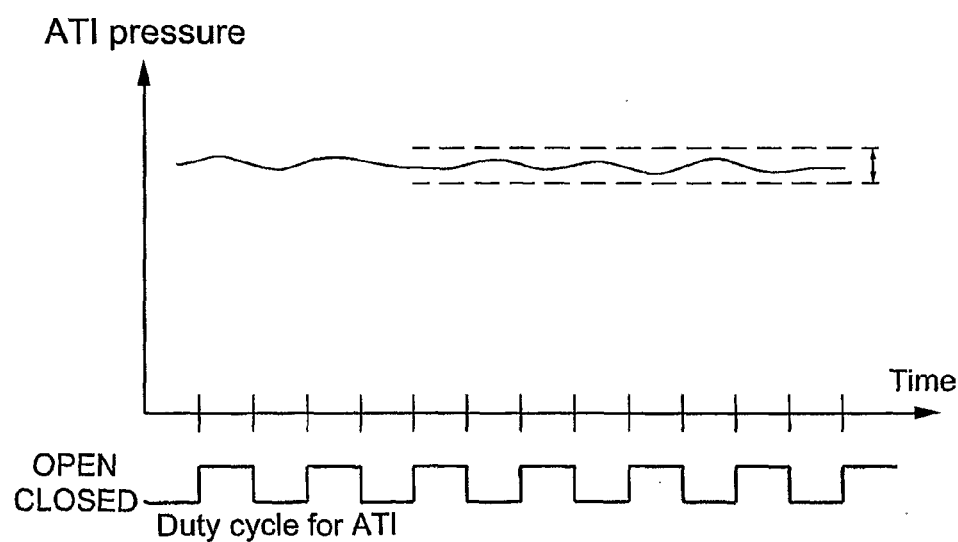

In FIG. 3 is exemplified how pressure curves may look like. In FIG. 3 *a* is plotted a curve from measured data (raw data) for a well functioning ATI and in FIG. 3 *b* is plotted a curve from measured data for a clogged ATI. Below the X-axis is shown the duty cycle of the ATI, i.e. the frequency or time intervals at which the injector is kept in open respectively closed state. In this case the opened and closed times are equally long and the interval may for example be 50 ms. As can be easily seen from the figures, the amplitude of the curve, which corresponds to pressure differences or pressure oscillations sensed by the pressure sensor located in or near the ATI, is considerably larger in FIG. 3 *a* than in FIG. 3 *b*. In addition, the curve in FIG. 3 *b* is a little bit irregular and has no sharp, repeated shape such as the sinus like curve in FIG. 3 *b*. Due to a clogged state, the sensed pressure differences will not be as large as for a clean ATI.

Figure 4:
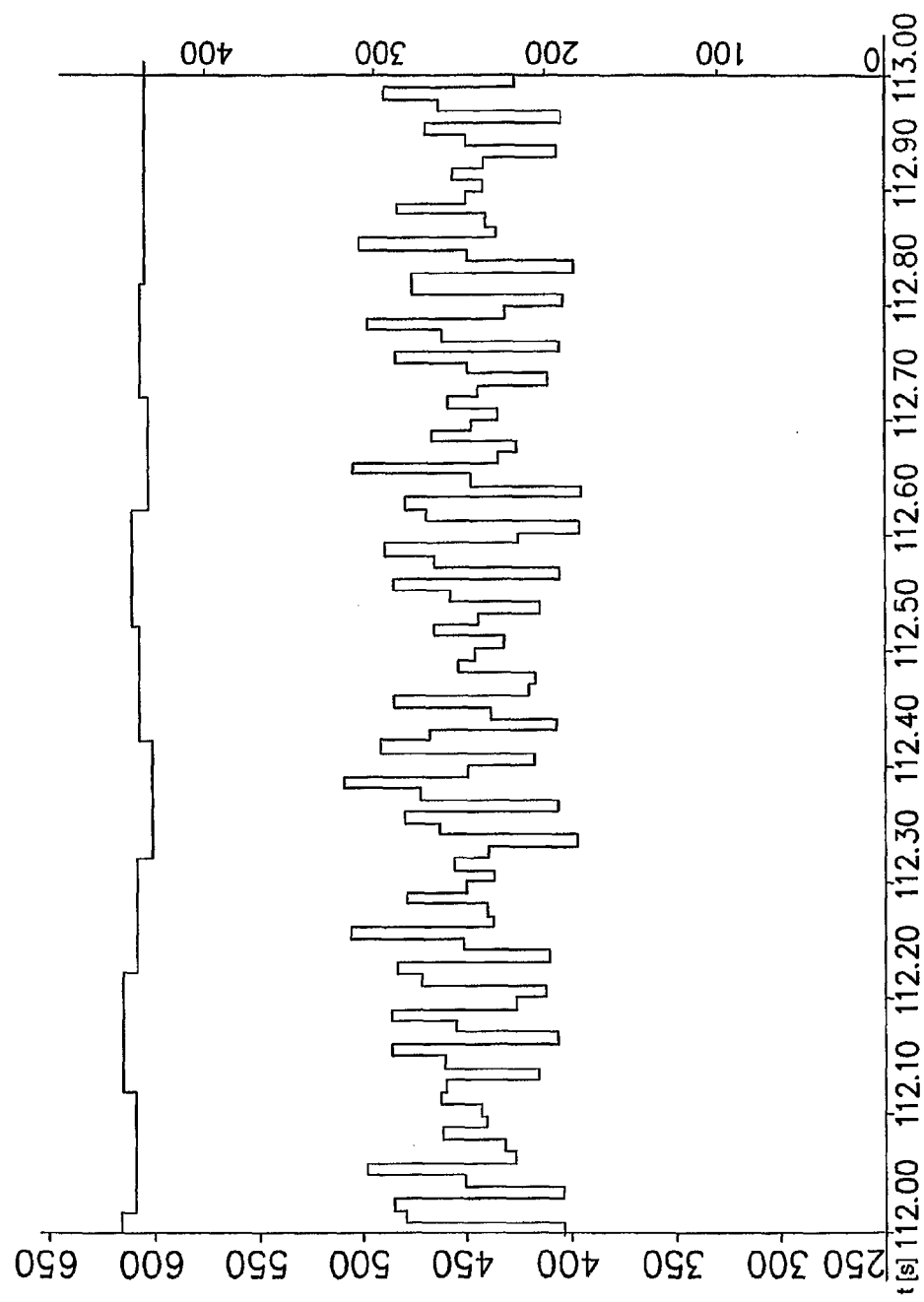
FIG. 4 shows a diagram of pressure values sensed by the pressure sensor for an inactive (closed) injector

In FIG. 4 is shown a diagram containing a first, lower curve showing pressure fluctuations sensed by a pressure sensor for an inactive injector. The pressure sensed by the sensor in the ATI fluctuates between 400 and 500 bars (left side scale). The upper curve showing small fluctuations around 430 bars (right side scale) indicates the system fuel pressure. The time period shown in the diagram is 1 second and the pressure at the ATI is measured every hundredths of a second. In this case, the engine is operated at 600 rpm.

Figure 5:
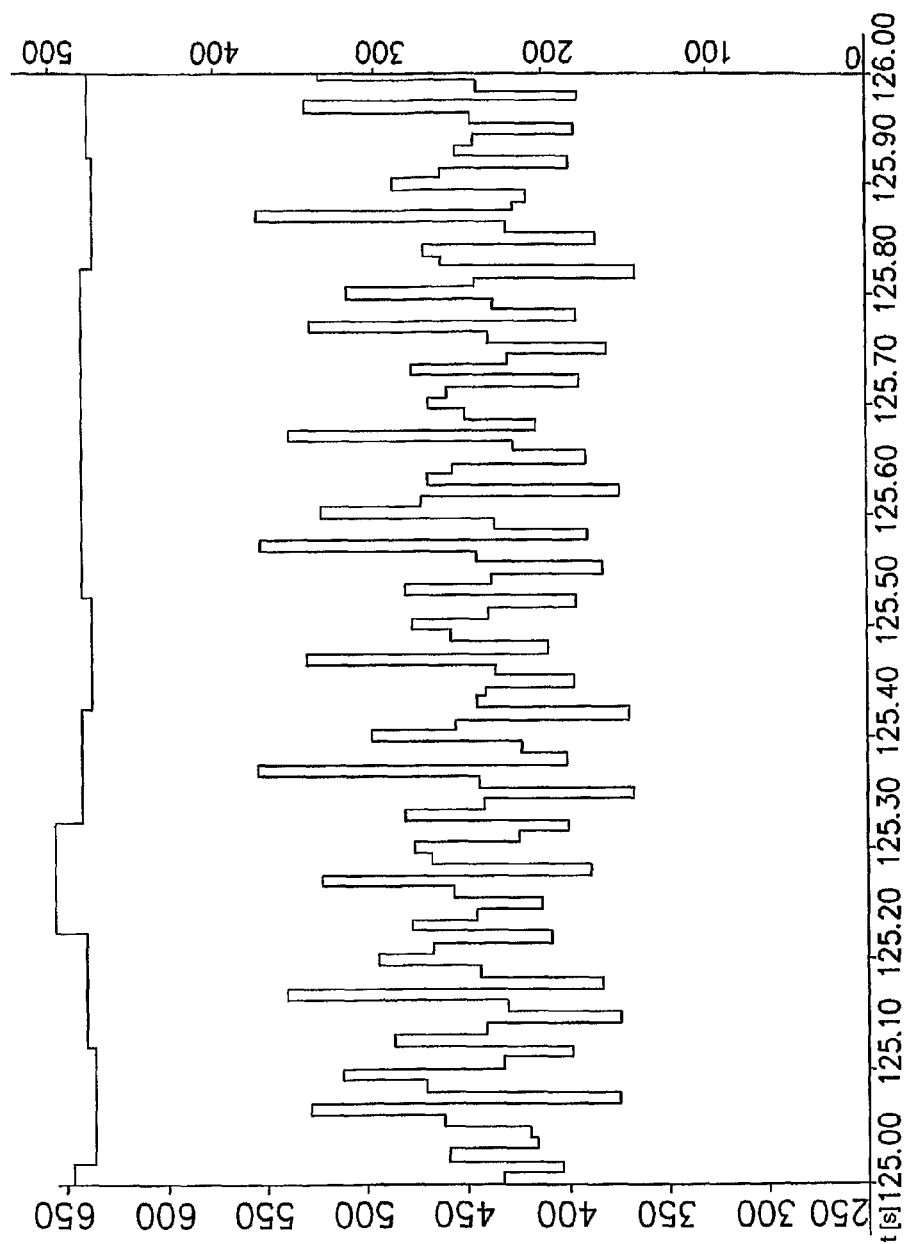
FIG. 5 shows a diagram of pressure values sensed by the pressure sensor for an active injector at 50% Phase Width Modulation (PWM) performing a status change (opening/closing of the injector) at every 50 ms FIG. 6 A diagram showing the shape of a pressure curve for a test cycle according to a preferred embodiment

The diagram in FIG. 5 shows pressure fluctuations sensed by a pressure sensor for an active injector when the same engine is operated at the same engine speed (600 rpm). The scales, the curves, the time period detected and the measurement points (100 in a second) in FIG. 5 correspond to the ones in FIG. 4. FIG. 5 shows the raw data from a 50% duty cycle (i.e. the injector is open 50% of the time and closed 50% of the time). The periodicity is 100 ms, i.e. the injector is open 50 ms and closed 50 ms and is controlled by a 10 HZ Pulse Width Modulation (PWM) signal. In FIG. 5 it can be interpreted that there is a periodicity of about 100 ms (the ten highest peaks have a frequency of occurring every 100 ms) and having an amplitude variation between around 370 and 550 bars while the peaks are lower and without a distinct periodicity in FIG. 4. Hence, larger amplitude is achieved at the same operation point with an active duty cycle of the ATI (FIG. 5) and it is possible to spot higher amplitude and a periodicity of the signal. This signal characteristic can be used to monitor whether the injector can open, is clogged, stuck in a position or if there is something else which is causing the injector not to be able to operate properly. In one embodiment of the invention, these raw data may be used to indicate the functioning of the injector by simply comparing the measured maximum respectively minimum pressure values with the maximum and minimum reference pressure values for a specific duty cycle. An even more simple way of performing this check would be to simply check if there is any difference in the maximum and minimum measured pressure values when the injector is in a duty cycle and when it is not, i.e. when the injector is closed. It is also possible to perform a series of measurements in order to produce a pressure curve and read and compare the periodicity of the pressure curve produced.

Figure 6:
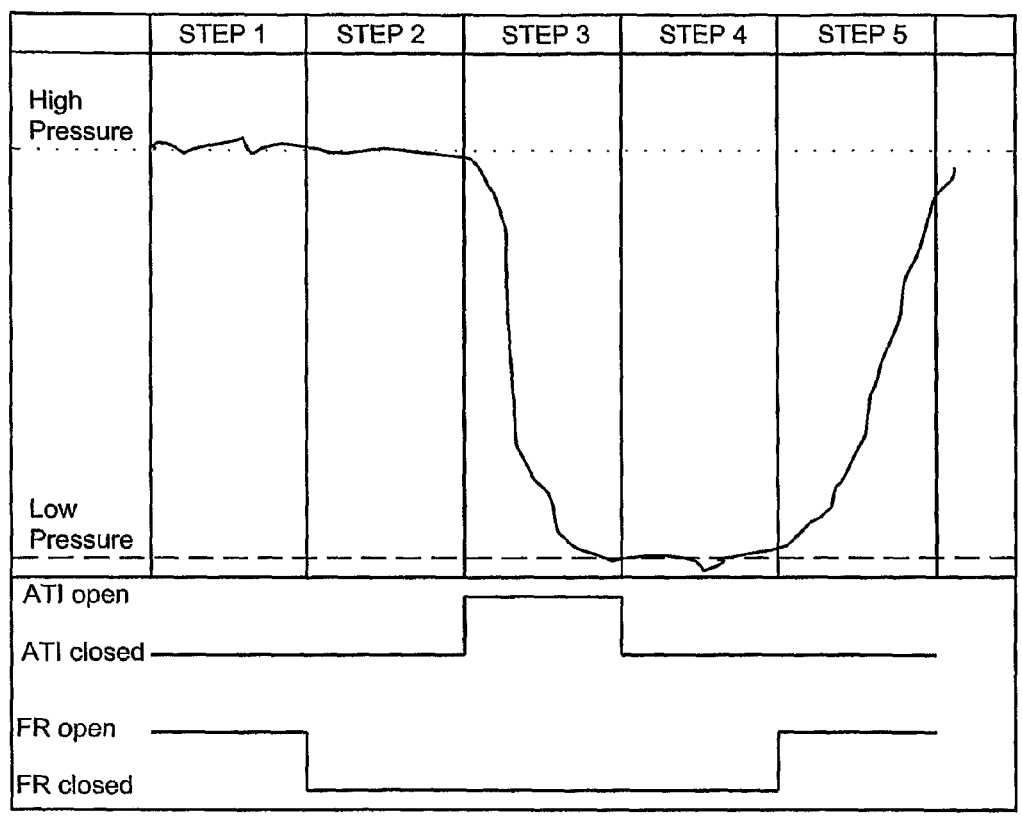

In FIG. 6, a curve is shown for a test cycle in which the ATSIS system is working as normal. In this figure, the expected pressure for each sequential step in the predetermined sequence of opening and closing commands for the flow control unit and the After Treatment Injector (ATI) is described. The upper straight line is marked as the "High pressure" level and indicates the same pressure as in a pressurized tank communicating with the space wherein the pressure sensor 8 is located (or may indicate the set pressure level to be delivered from a pump unit), e.g. the pressure sensed when a valve 9 is open and the ATI 6 is shut. The lower straight line in the diagram indicates the "Low pressure" levels which corresponds to the pressure in the exhaust gas system, e.g. when a valve 6 is closed (or a pump 6 for delivering a pressurized fluid is in a non-working state) and the ATI 6 is open. Below the curve indicating the pressure detected by the pressure sensor 8 (see FIG. 1 or 2) is an indication of the state of the ATI 6 (FIG. 1 or 2) and the flow regulator (FR) 9 (FIG. 1 or 2). In this case, the ATI is set to completely open or completely shut and the flow regulator is a valve which is controlled to be either open or closed to control the flow of a pressurized liquid upstream.

In order to be able to accurately set a reference curve, it should be set under those conditions for which the engine is expected to be working when the cycle is performed. The reference curve, or curves, made up may be an average curve from a multitude of curves and there may also be a multitude of different reference curves for different conditions and different parameters, e.g. the timing for keeping each set conditions in each step may vary and there may also be different step sequences. The curves may be system specific, i.e. a reference curve is made up for each, individual system for each vehicle or may be made at a test rig for a well defined set up. In this curve, the test cycle is set up according to the specific cycle described in table 1 comprising the following steps:

1. Set the flow control unit to open and set the ATI to be closed.
2. Close the flow control unit and keep the ATI closed.
3. Keep the flow control unit closed and open the ATI
4. Keep the flow control unit closed and close the ATI.
5. Open the flow control unit to open and keep the ATI closed.

It is evident that the accuracy may be improved by making several reference curves of the system when it is possible to positively assure that the system is working, it will also be possible to make curves for a defective system if, for example, it is possible to simulate a leakage in some part of the system by controlling the closure of the flow regulator or ATI to not close completely in the closed state or not opening the ATI completely in its open state and thus simulating a clogging of the injector. In order to detect leakage it might be advisable to use a cycle having a larger duration of step 3, i.e. a step wherein the ATI and the flow control are closed so as to define a closed space with a pressurized liquid inside, which makes it possible to detect also a small leakage having a slow decrease in the pressure.

Hence, the skilled person in the art may within the scope of the present invention modify and try out different test cycles and make up specific reference curves for specific conditions in order to select the desired way of testing and monitoring a specific after treatment substance injection system.

The invention claimed is:

1. A method for monitoring of an after treatment injector (ATI) located in an exhaust gas system of an internal combustion engine, the exhaust gas system comprising:
   an exhaust gas purification unit,
   an after treatment substance injection system (ATSIS) including
   a) the ATI for injection of a substance into the exhaust gas system,
   b) a conduit for supplying of the substance from a container to the ATI,
   c) a pressure sensor located in or near the ATI in such a way it will sense a pressure of the substance in the ATI,
   d) an electronic control unit (ECU) for control of the ATI, and
   e) a flow regulator which controls the flow in the conduit for the conduit for supplying of the substance from a container to the ATI, and
   an on board diagnosing (OBD) system which is connected to the ECU and the pressure sensor, either directly or via the ECU, the OBD being provided with comparative data for deciding functionality of the ATI in order to detect abnormal functionality of the ATI,
   the method comprising
   suspending normal operation of the ATI and initiating a control sequence for monitoring functionality of the ATI, the control sequence comprising performing, via the ECU, the following sequential steps:
   I. setting the flow regulator to open and setting the ATI to be closed,
   II. closing the flow regulator and keeping the ATI closed,
   III. keeping the flow regulator closed and opening the ATI,
   IV. keeping the flow regulator closed and closing the ATI without opening the flow regulator before closing the ATI, and
   V. opening the flow regulator to open and keeping the ATI closed,
   performing, via the OBD, a frequency analysis of measured pressure values detected by the pressure sensor during performance of the predetermined sequence of opening and closing commands and preparing a pressure curve with the measured pressure values.

2. A method according to claim 1 comprising making at least one of the reference curve and the pressure curve by using mathematical methods filtering off frequencies not originating from opening/closing of tile flow regulator or other control valves connected to the injector.

3. A method according to claim 2 comprising using Fourier Analysis for filtering off frequencies not originating from the opening/closing of the flow regulator or control valves connected to the injector.

4. A method according to claim 1 comprising preparing the at least one of the reference curve and the pressure curve from the detected pressure values in the ATI based on the actual values sensed by the pressure sensor.

5. A method according to claim 1 comprising preparing the at least one of the reference curve and the pressure curve from the detected pressure values in the ATI based on refined pressure values which have been prepared by subtracting background pressure fluctuations according to a pressure sensor sensing background pressure fluctuations.

6. A method according to claim 5 comprising setting to different values, via the ECU, a duration of time of different ones of the sequential steps for keeping the flow regulator and the ATI in their programmed positions.

7. A method according to claim 5, comprising monitoring, via the OBD, functionality of the exhaust gas purifying devices in the exhaust gas system, the OBD system being programmed, to indicate a malfunctioning of the pressure sensor when an abnormality in the ATSIS, is detected while the exhaust gas purifying devices in the exhaust gas system function as normal.

8. A method according to claim 5, wherein the comparative data for the functionality of the ATSIS is based on pre-programmed data for the ATSIS from one or several test cycles from a test rig.

9. A method according to claim 5, wherein the comparative data for the functionality of the ATSIS is based on one or several test cycles for the specific, individual system to be monitored.

10. A method according to claim 5, wherein the OBD system controls the ECU to perform a predetermined sequence of opening and closing commands for the flow regulator and the ATI in order to monitor functionality of the flow regulator, the ATI and the pressure sensor when an abnormal function of the functionality of the exhaust gas purifying devices in the exhaust gas system is detected.

* * * * *